United States Patent
Poston et al.

(10) Patent No.: US 9,189,134 B2
(45) Date of Patent: Nov. 17, 2015

(54) DISPLAY WINDOW WITH MULTI-LAYER, PARALLEL TAB DISPLAY

(75) Inventors: Ricky Poston, Austin, TX (US); Ting He, Austin, TX (US); Michael Cooper, Houston, TX (US)

(73) Assignee: BMC SOFTWARE, INC., Houston, TX (US)

( * ) Notice: Subject to any disclaimer, the term of this patent is extended or adjusted under 35 U.S.C. 154(b) by 1020 days.

(21) Appl. No.: 13/251,187

(22) Filed: Sep. 30, 2011

(65) Prior Publication Data
US 2013/0086507 A1 Apr. 4, 2013

(51) Int. Cl.
*G06F 3/048* (2013.01)
*G06F 3/0483* (2013.01)

(52) U.S. Cl.
CPC .... *G06F 3/0483* (2013.01); *G06F 2203/04803* (2013.01)

(58) Field of Classification Search
CPC .............. G06F 3/0483; G06F 2203/04803
USPC ........................................ 715/777
See application file for complete search history.

(56) References Cited

U.S. PATENT DOCUMENTS

| | | | | |
|---|---|---|---|---|
| 5,745,716 A | * | 4/1998 | Tchao et al. | 715/777 |
| 5,933,142 A | * | 8/1999 | LaStrange et al. | 715/788 |
| 6,166,736 A | * | 12/2000 | Hugh | 715/798 |
| 8,713,465 B1 | * | 4/2014 | Jitkoff et al. | 715/777 |
| 2005/0193360 A1 | * | 9/2005 | Otsubo | 716/18 |
| 2006/0218500 A1 | * | 9/2006 | Sauve et al. | 715/767 |
| 2007/0162864 A1 | * | 7/2007 | Masselle et al. | 715/765 |
| 2008/0040682 A1 | * | 2/2008 | Sorenson et al. | 715/777 |
| 2009/0006979 A1 | * | 1/2009 | Callanan et al. | 715/751 |
| 2009/0217192 A1 | * | 8/2009 | Dean et al. | 715/777 |
| 2009/0319937 A1 | * | 12/2009 | Molander et al. | 715/777 |
| 2009/0327947 A1 | * | 12/2009 | Schreiner et al. | 715/777 |
| 2010/0115450 A1 | * | 5/2010 | Scott et al. | 715/777 |
| 2011/0131523 A1 | * | 6/2011 | Grant et al. | 715/777 |
| 2011/0179375 A1 | * | 7/2011 | Shupp et al. | 715/777 |
| 2012/0060111 A1 | * | 3/2012 | Kim | 715/777 |

OTHER PUBLICATIONS

Newbold et al., "Basic Excel 2010 Workshop 101", UCSD Libraries Education Services, Jun. 13, 2011, 28 pages.
"Help—Rational Software Architect", retrieved from pic.dhe.ibm.com/infocenter/rsahelp/v8/index.jsp?topic=%2Fcom.ibm.rad.samptut.doc%2Fsamples%2Fwidget%2Ftopics%2Fstockwidgetdetails.html, Apr. 6, 2010, 4 pages.
OneNote Tutorial, retrieved from http://highered.mcgraw-hill.com/sites/dl/free/007661395x/903627/OneNote_Tutorial.pdf, May 20, 2011, 43 pages.
"Intermediate Excel 2010—Data Management Topics", Office of Information Technology, West Virginia University, Version 1.6, Feb. 14, 2011, 17 pages.
"Task Assignment Cards Widget: Shotgun Support", retrieved from webcache.googleusercontent.com/search?q=cache:i1dMfmydt3IJ:https://support.shotgunsoftware.com/entries/184925-Task-Assignment-Cards-Widget+&cd=4 . . . , May 31, 2010, 3 pages.

* cited by examiner

*Primary Examiner* — Patrick Riegler
(74) *Attorney, Agent, or Firm* — Brake Hughes Bellermann LLP

(57) ABSTRACT

A layer manager provides at least two content layers within a user interface window of a software application. A tab manager provides at least two content tabs within at least one of the content layers. A transfer manager is configured to transfer at least one content tab between the at least two content layers.

18 Claims, 5 Drawing Sheets

DISPLAY WINDOW WITH MULTI-LAYER, PARALLEL TAB DISPLAY

TECHNICAL FIELD

This description relates to graphical user interfaces and other display windows.

BACKGROUND

Often when displaying information, software applications may be required to display related information using two or more portions of a graphical user interface or other display window. For example, some software applications may display a primary data object within one portion of a user interface, while providing a number of related data objects in other portions of the user interface. In other examples, software applications may provide individual, selectable sheets, any one of which may be selected for display on an associated user interface.

However, in the first example, in which a primary object is simultaneously displayed in conjunction with the number of secondary or otherwise related objects, it may occur that a total number of displayed objects is such that relatively small amounts of room within the display window are available for each of the individual data objects. Consequently, it may be difficult for users to interact with such relatively small display portions. Moreover, it may be difficult to arrange the various data objects for display within the user interface, in a manner which uses the available space efficiently. Further, it may be difficult to enable a user to select a particular data object for viewing within an entirety of the graphical user interface, particularly while maintaining an ease of availability of any remaining non-selected data objects within the display.

In the second example of display techniques provided above, in which a plurality of sheets are individually selectable by, and provided to, a user of a corresponding software application, it may occur that the user finds it difficult or impossible to simultaneously view (or otherwise interact with) selected ones of the available sheets. Thus, in such examples, although it may be straightforward for a user to quickly and easily view an entirety of a selected sheet, it is difficult or impossible for the user to view multiple ones of the sheets simultaneously and in synchronization with one another.

Consequently, neither of the above-referenced example display techniques are sufficient for providing users with straightforward, intuitive display techniques for selecting and viewing desired content within different portions of a display window and/or simultaneously, or in synchronization within, the display window. As a result, users may experience frustration, as well as inefficient use of time, during the use of conventional graphical user interfaces and other display windows.

SUMMARY

According to one general aspect, a computer system may include instructions recorded on a computer-readable medium and executable by at least one processor. The system may include a layer manager configured to cause the at least one processor to provide at least two content layers within a user interface window of a software application, a tab manager configured to cause the at least one processor to provide at least two content tabs within at least one of the content layers, and a transfer manager configured to cause the at least one processor to transfer at least one content tab between the at least two content layers.

According to another general aspect, a computer-implemented method may include providing at least two content layers within a user interface window of a software application, providing at least two content tabs within at least one of the content layers, and transferring at least one content tab between the at least two content layers.

According to another general aspect, computer program product may be tangibly embodied on a computer-readable medium and may include instructions that, when executed, are configured to provide at least two content layers within a user interface window of a software application, provide at least two content tabs within at least one of the content layers; and transfer at least one content tab between the at least two content layers.

The details of one or more implementations are set forth in the accompanying drawings and the description below. Other features will be apparent from the description and drawings, and from the claims.

DETAILED DESCRIPTION

Figure 1:
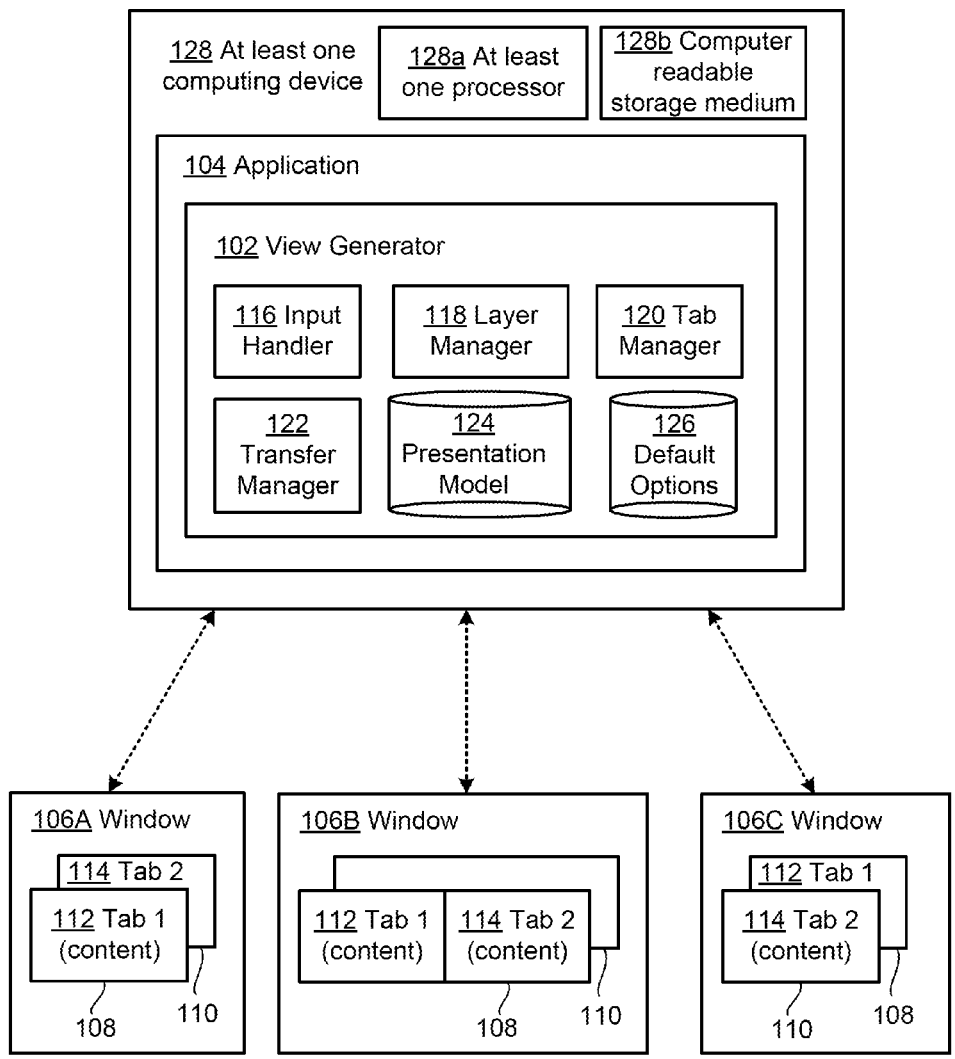
FIG. 1 is a block diagram of a system for providing a display with multiple layers having parallel tabs.

FIG. 1 is a block diagram of a system 100 for providing multi-layer, parallel tab display windows. In the example of FIG. 1, a view generator 102 of a software application 104 may be configured to provide a user interface or other display window which displays two or more selectable content layers, which may each include zero or more content tabs which may be transferred between the selectable content layers and displayed in conjunction with one another in the context of a given, selected content layer. As a result, as shown and described in detail below, the view generator 102 may provide a user of the system 100 with a fast, efficient, and intuitive platform for simultaneously viewing or otherwise interacting with related content.

In the example of FIG. 1, it may be appreciated that the view generator 102, in practice, may include a number of conventional components which may not be specifically described and illustrated below, but which may nonetheless be apparent to one of skill in the art. Similarly, it may be appreciated that the application 104 may include virtually any software application which may utilize, or benefit from, inclusion of the view generator 102. As with the illustrated view generator 102, it may be appreciated that the application 104 may include a number of conventional components, features, or functions, which are not necessarily described herein.

Thus, it may be appreciated that examples of the software application 104, and thus of conventional aspects of the view generator 102, are too numerous to describe here in any significant detail. Nonetheless, by way of non-limiting example, it may be appreciated that the application 104 may include a word processing application, a spreadsheet application, an editing application for picture and/or video files, a software application for creating technical drawings or diagrams, and virtually any other software application which may utilize an interactive visual display.

In particular examples, for instance, the application 104 may include any one of a number of known internet browsers, and/or related network applications, (e.g., web applications). Of course, as already referenced, a variety of other types of software applications, not specifically mentioned or described in detail here, including, e.g., special purpose software applications, educational software applications, game-related software applications, business management software applications, and many others, or variations of combinations thereof, may be represented by the application 104.

Consequently, as also referenced above, the view generator 102 may include a number of conventional features and functionalities associated with providing an interactive visual display, many of which may be customized or specialized with respect to, or dependent upon, a corresponding type or nature of the software application 104. For example, the view generator 102 may be configured to provide various display windows of designated shape, sizes, and other configurations, as well as associated, selectable configuration options which enable the user to select between the various possible shapes, sizes, and many configurations.

Similarly, the view generator 102 may include various features and functionalities related to enabling the interactive nature of user interfaces provided by the view generator 102. For example, the view generator 102 may utilize conventional technologies to display or otherwise provide elements which are selectable by a user of the system 100 for subsequent modification of the elements and/or of related components or features of a corresponding interactive display. Although again such elements are well known and too numerous to describe here in any significant detail, it may be appreciated that such interactive elements may include, e.g., text entry fields, drop-down menus, pop-up windows, and various other buttons, icons, menus, toolbars, and many other additional or alternative interactive elements.

Thus, in the example of FIG. 1, the view generator 102 may be configured to provide a graphical user interface or other display window, instances or configurations of which are illustrated in FIG. 1 as windows 106A, 106B, 106C. That is, it may be appreciated that the windows 106A-106C represent a single display window, where the various illustrated configurations 106A-106C are provided for the sake of explanation and example, and generally represent and illustrate various display options provided for the user by the view generator 102.

For example, the configuration 106A illustrates that the corresponding display window may include a plurality of content layers, or layers, which are illustrated in the simplified example of FIG. 1 as including layers 108, 110. As referenced above, and as illustrated with respect to the configuration 106A, each content layer 108, 110 may include 0, 1, 2, or more tabs and associated content, illustrated in the example of FIG. 1 as tabs 112, 114.

In this context, tabs 112, 114, also referred to as content tabs, may be understood to represent virtually any display technique which is capable of displaying the types of content which may be associated with the software application 104 as described above, e.g., document processing applications, spreadsheet applications, or photo/video editing applications, to name a few. Thus, the tabs 112, 114 may similarly be referred to as, or may be understood to include, windows, sub-windows, or panes, or virtually any other type of display which may be provided in the various manners described herein with respect to the tabs 112, 114 and corresponding to FIGS. 2A-2C, and FIGS. 3A, 3B.

Thus, in the example configuration 106A, it may occur that the tab 112 and associated content is provided within a layer 108, while the tab 114 and associated content are included within the content layer 110. As illustrated, the various layers 108, 110 may be provided in a stacked arrangement, in which a selected layer is provided at a front of the stacked arrangement, and therefore is visible to a user of the system 100, while remaining, currently non-selected layers are provided within the stacked arrangement as being partially or completely obscured or hidden behind the front, visible layer.

However, as described and illustrated below, any one of the non-selected, hidden layers may be selected at any time desired by the user for display as the front, visible layer, at which time the previous front, visible layer may be exchanged with the previously hidden layer, or may otherwise be made partially or completely obscured within the stacked arrangement of layers. Further, the tabs 112, 114 may individually be transferred among the available layers, 110. For example, in the configuration 106B, such an inter-layer transfer of the tab 114 is illustrated, in which the tab 114 is transferred from the layer 110 to the layer 108 for display in conjunction with the tab 112.

That is, as shown, in the context of the plurality of layers 108, 110, each such layer may be configured to include and display two or more tabs. Further, the tabs may be displayed and arranged in a manner which is optimized for an ease of the user of the system 100 in simultaneously viewing content of the tabs 112, 114, e.g., including aligning or otherwise synchronizing the content. Further, the display of the two or more tabs 112, 114 within a single layer 108 may include other selectable elements or aspects for customizing a manner in which the tabs 112, 114 are displayed within the layer 108 and/or relative to one another. For example, as described below, various sizing elements may be included which enable the user to configure and arrange relative sizes of the tabs 112, 114 relative to one another within the layer 108.

Although not specifically illustrated in the example of FIG. 1, the windows 106A-106C may include, e.g., within each individual tab, various types of tab transfer elements associated with the above-referenced transfer of tabs within or between the available layers 108, 110.

Further, in the example configuration 106C, the layer 110 is illustrated as having been selected and therefore provided at a front of the stacked arrangement of layers 110, 108, so as to be visible to the user of the system 100. In other words, with respect to the configuration 106A, configuration 106C illustrates an ability of the view generator 102 to transfer or otherwise rearrange the various layers (and any included tabs/content) relative to one another within the stacked arrangement thereof.

Specifically, as shown, the example configuration 106C may be understood to represent a variation of the configuration 106A, in which the order of the layers 108, 110 within the stacked arrangement thereof has been switched. As referenced above with respect to the various types of inter-layer tab transfer elements, which are not specifically illustrated in the example of FIG. 1, the view generator 102 may provide layer selection elements which are specific to each individual layer, and which generally provide for the selection of a specific layer for display thereof at a front of the stacked arrangement of layers described herein. Specific examples of the just-referenced inter-layer tab transfer elements and layer selection elements are provided below, e.g., with respect to FIGS. 2A-2C and 3A, 3B.

Further, to provide the above-referenced features and functionalities, and related features and functionalities, some of which are described below, the view generator 102 may include a plurality of components 116-126. For example, as shown, the view generator 102 may include an input handler 116 which may be configured to receive specific input from the user of the system 100 with respect to the various layers 108/110 and tabs 112/114.

For example, the input handler 116 may receive input from the user of the system 100 with respect to various desired actions related to the sizing, visual appearance, or other aspects of the display window 106A-106C, as would be apparent. More particularly, the input handler 116 may receive inputs from the user of the system 100 with respect to the types of inter-layer type transfer elements and/or layer selectors referenced above. Various other examples of potential input received and processed by the input handler 116 are described below, and/or would be apparent to one of skill in the art.

Further, a layer manager 118 may be configured to create, modify, utilize, or otherwise manage the stacked arrangement of layers 108, 110. For example, the layer manager 118 may be configured to create a third content layer, not specifically illustrated in the example of FIG. 1, based on a request received by way of the input handler 116. More generally, the layer manager 18 may be responsible for executing layer selections received from the user by way of the input handler 116, to thereby provide a selected layer as the front, visible layer of the stacked arrangement of layers, and to correspondingly position remaining layers behind the currently-selected layer.

Similarly, a tab manager 120 may be configured to create, arrange, and otherwise maintain and utilize the various tabs of the system 100, including the tabs 112, 114 of the example of FIG. 1. That is, the tab manager 120 may be responsible for creating one or more tabs requested by the user by way of the input handler 116. The tab manager 120 may additionally manage the types of inter-layer tab transfers described above, e.g., with respect to the change from the configuration 106A to the configuration 106C.

In the example of FIG. 1, the transfer manager 122 is illustrated as a separate component from the layer manager 118 and the tab manager 120, and is configured to specifically execute tab transfers between layers, and/or layer transfers within the stacked arrangement of layers. For example, in the example of FIG. 1, the view generator 102 may include a presentation model 124, which generally may represent one or more data structure used to represent the various features and functions described herein.

A specific example of such a data structure is illustrated and described below with respect to FIGS. 5 and 6, but in general, it may be appreciated that the presentation model 124 of FIG. 1 represents a hierarchical data structure in which the layers 108, 110 are at a highest level and include zero or more tabs at a lower level, and further include actual tab content and/or pointers, links, or other references to actual content at a third level. In such example embodiments, it may be appreciated that the layer manager 118 and the tab manager 120 may be configured to create, modify, delete, or otherwise manage corresponding portions of the data structure of the presentation model 124. Meanwhile, in the example of FIG. 1, the transfer manager 122 may be responsible for actually executing transfers of elements of the data structure from one portion of the data structure to another portion thereof.

For example, it may occur that the presentation model 124 includes the layers 108, 110 and further includes tabs 112, 114 in each layer 108, 110, respectively. Thus, such an example may be illustrated by the configuration 106A, in which each content layer 108, 110 includes a corresponding tab 112, 114. In such examples, it may occur that corresponding content of the tabs 112, 114 is located at a separate memory location from the memory location of the presentation model 124. In such scenarios, as referenced above, the presentation model 124 may include links, pointers, or other references from a given tab to its corresponding content.

Thus, in the example of FIG. 1, a configuration 106B illustrates that the tab 114 is transferred from the layer 110 to the layer 108. In such scenarios, the transfer manager 122 may be configured to transfer the tab 114 from the portion of the data structure which is beneath the layer 110 to the portion of the data structure that is beneath the layer 108. As may be appreciated, in an example scenario, such transfers may include transfer of the corresponding pointer from the tab 114 to the tab 112, including, e.g., continuing to identify its corresponding content.

In alternative example embodiments, it may occur that some or all of the functionalities of the transfer manager 122, including those just described, may be implemented by the layer manager 118 and/or the tab manager 120. That is, for example, the transfer manager 122 may be implemented as part of one or both of the layer manager 118 and the tab manager 120.

As shown, the view generator 122 may include default options 126, which generally represent selectable configuration options related to the display and operation of the multi-layer parallel tabs described herein. For example, configuration of the default options 125 may enable the user to experience a default display configuration in which, upon opening the application 104, a specific number of layers and/or tabs may be provided according to a specified arrangement.

The default options 125 may further include various configuration options related to a manner in which the various functionalities above (e.g., inter-layer tab transfers and layer selections) are executed. For example, as described below, with respect to FIGS. 2A-2C as compared to the FIGS. 2A-3B, the default options 12 may cause the view generator 102 to provide a different size or amount of layers/tabs, or other user interface elements for implementing the functions described herein.

Finally in the example of FIG. 1, the system 100 is illustrated as including at least one computing device 128, at least one processor 128a, and a computer readable storage medium 128b. As may be appreciated, the computing device 128 may include virtually any computing device, including, e.g., a desktop computer, a network computer, a laptop, notebook, or netbook computer, or any one of a number of types of smartphones or tablet computers.

As is known, such computing devices may include a plurality of processors, represented by the at least one processor 128a, which may be utilized to execute operations in parallel, so as to thereby provide a faster and more efficient computing experience. In so doing, the processors 128a may execute instructions stored in the computer-readable storage medium 128b, which may generally represent virtually any type of computer memory which may be utilized to store such instructions.

Consequently, it may be appreciated that the application 110, the view generator 102, and various components 116-126, may be executed using two or more computers which are in communication with one another over a computer network, e.g., the public internet, a local or personal area network, a corporate intranet, or virtually any other type of computer network which facilitates communications between the two or more computing devices 128a of the example.

For example, the application 104 may represent a web application executing on a remote computing device, and accessed by a local user using a local computing device executing an internet browser. In these examples, it may be appreciated that some components of the view generator 102 may be implemented at a remote computer, while other components may be implemented at the local computer.

For example, the remote computer may include a server executing functionalities of the application 104, while the view generator 102 may be executed using client side scripting techniques which are known to provide an enhanced and responsive user experience for the user of the system 100.

Although the examples of FIG. 1 illustrate a variety of components as separate or discrete elements, it may be appreciated that any two or more such elements may be implemented using a single element. For example, as described above, the layer manager 118 and/or the tab manager 120 may incorporate functions of the transfer manager 122. Conversely, any single element may be implemented using two or more components which each perform a sub-function of the described element of FIG. 1. Further, additional or alternative components, not specifically illustrated in the example of FIG. 1, also may be included.

Figure 2A:
FIGS. 2A-2C are example screenshots that may be used in the system of FIG. 1.

Paragraph FIG. 2A illustrates an example screenshot in which a layer 202 includes and displays only a single tab 204 and its associated content. Meanwhile, a second layer 206 is illustrated as being behind the layer 202, and is illustrated as including additional tabs 207, 208. In other words, with reference to FIG. 1, it may be appreciated that the layer 202 may be analogized to the layer 108, while the tab 204 may be understood to correspond to tab 112 of FIG. 1. Thus, the layer 206 may be understood to correspond to the layer 110 of FIG. 1, and to include tabs 207, 208 corresponding to the tab 114.

Further, in the example of FIG. 2A, the presence of the second, hidden layer 206 is visually represented in the example by the illustrated protruding portions of the tabs 207, 208 which extend into a visible area of the corresponding display window. In the specific example of FIG. 2A, such indications of the hidden layer 206 and the inclusion of the tabs 207, 208 therein is provided, as is referenced, by the protruding portions of the tabs 207, 208. These portions may be modifiable and editable by the user, so as to further customize the disclosed embodiments. For example, the user may be able to provide specific names, e.g., file names, which are associated with the corresponding tab and content thereof.

In the example of FIG. 2A, the protruding portions of the tabs 207, 208 may themselves be referred to as tabs, inasmuch as they represent the entirety of the corresponding tab and associated content within a corresponding hidden layer. In other words, as referenced above, such usage of the term tab is not intended to be limiting, and, to the contrary, the term tab should be understood to represent virtually any display which may be included within the various content layers 202, 206 described herein.

Consequently, it may be appreciate that additional or alternative techniques for indicating a presence or identify of hidden tabs may be utilized, other than the protruding portions of the tabs 207, 208 illustrated in the example of FIG. 2a. For example, such a tab selection/identification element may be provide elsewhere within the corresponding display window, e.g., using a row of tab-specific elements along the bottom or other portion of the display window. Similarly, such identification and other features may be provided, e.g., through the user of right-click mouse functionality for displaying available tabs, perhaps in conjunction with their corresponding layers (i.e., with other tabs thereof).

Further in the example of FIG. 2A, a tab transfer element 210 is illustrated as being included within the tabs 207, 208 of the layer 206. As may be understood from the above description, the element 210 enables the types of inter-layer tab transfers referenced above. For example, the tab transfer element 210 may be selected for transferring the tab 207 or 208 from the layer 206 to 202.

Further in FIG. 2A, an options element 212 is illustrated, which when selected, may provide the user with the ability to set the default options 126 described and illustrated above with respect to FIG. 1

Finally in FIG. 2A, a window float icon 214 is illustrated, which, when selected, may provide the corresponding tab, i.e., the tab 204 in the example of FIG. 2A, for display as a floating window which is displayed independently and separately from the layers 202/206. A specific example of such a floating window is provided below with respect to FIG. 2C.

Figure 2B:
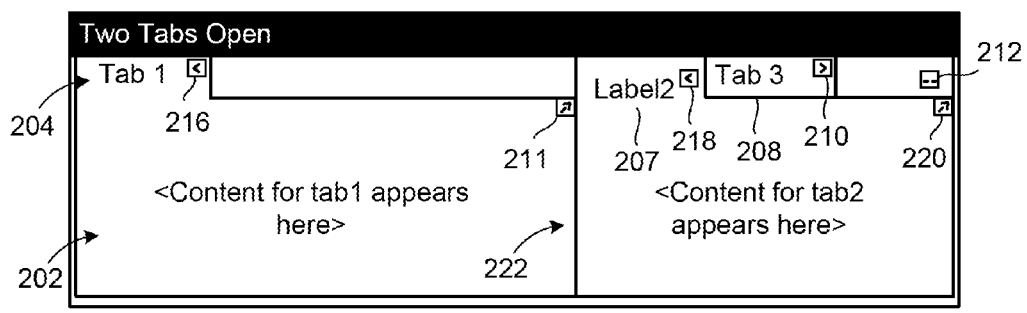

FIG. 2B illustrates an example screenshot in which the user has selected the tab transfer element 210 of the tab 207. As a result, in FIG. 2B, the tab 207 has experienced an inter-layer tab transfer, as may be executed by the transfer manager 122 as described herein, and is therefore displayed within the layer 202. Thus, the example of FIG. 2B illustrates a scenario in which the layer 202 includes the tabs 204, 207, and is therefore analogous to the configuration of FIG. 1, except that in the example of FIG. 2, the hidden layer 206 continues to include the tab 208.

As may be appreciated from the above description of FIG. 1, inasmuch as the layer 202 includes the tabs 204, 207, the user may wish to transfer either of the tabs (back) to the layer 206. Consequently, tab transfer elements 216, 218 are provided, which, when selected, automatically causes the transfer manager 122 to execute a transfer from layer 202 to layer 206.

During the types of inter-layer tab transfers just described with respect to FIGS. 2A and 2B, it may be appreciated that the view generator 102 may transfer the tabs in question in a manner which optimizes an ease of viewing of the transferred tab content, and/or which corresponds to user preferences that are stored in within the default options 126. For example, when transferring the tab 207 from the layer 206 to the layer 202, the tabs 204, 207 may initially be provided within the layer 202 as being equally sized, or may be provided in different proportions, if so specified within the default options 126. Once displayed, a selectable order 222 may be provided, which may be adjusted left to right in order to adjust relative sizes of the tabs 204, 207.

Also in the example of FIG. 2B, tab float elements 211, 220 are illustrated as being associated with the tabs 204, 207 in a one to one correspondence. Consequently, an illustrated flow with respect to FIG. 2C, the user may be enabled to select one or both of the tabs 204, 207 for display as an independent, separate tab which is untethered with respect to the remainder of the display window.

Figure 2C:
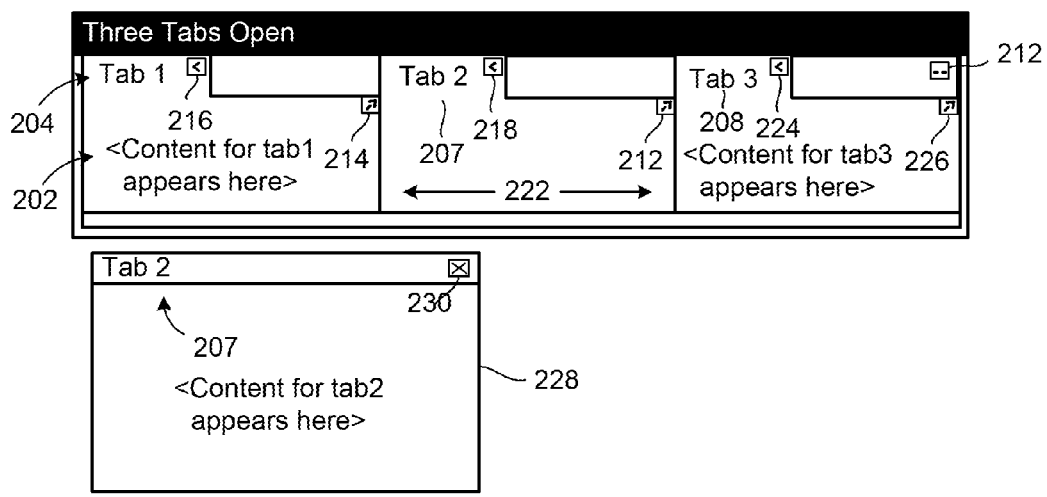

FIG. 2C illustrates a third example screenshot, in which the tab transfer element 210 of the label 208 as illustrated in the example of FIG. 2B has been selected by the user, so as to thereby cause an inter-layer tab transfer of the tab 208 from the layer 206 to the layer 202. Consequently, as already described with respect to the tab 207, the tab 208 may be included within the layer 202, and may be equally proportioned relative to the tabs 204, 207. Further, as also referenced above, the tab 208 may be provided with a tab transfer element 224 which, when selected, like the tab transfer element 218 of the label 207 in FIGS. 2B and 2C, may cause transfer of the tab 208 back to the layer 206. As also described with respect to FIG. 2B, a tab float element 226 may be provided in conjunction with the tab 208.

Thus, as referenced above, with respect to the tab float elements 211, 212, 226, it may occur that the user selects the tab float element 212 for the tab 207, and thereby obtains a floated tab 228. In example embodiments, the floated tab 228 may be provided separately from an entirety of the notebook which contains the layers 202-206 and the tabs 204, 207, 208. That is, for example, as shown in FIG. 2C, the floated tab 228 may be provided below the original display window. In other examples, the floated tab 228 may be provided within an extended portion of the original display window. In these and other examples, the floated tab 228 may be sized and moved independently of the original restrictions and constraints associated with inclusion/alignment with tabs 204, 208 with. In other example embodiments, the floated tab 228 may replace the original tab 207. That is, for example, in such examples the layer 202 may include only the tabs 204, 208, and the tab 207 may appear only as the floated tab 228. As shown, the floated tab 208 may include an element 234 for closing the floated tab 228.

Figure 3A:
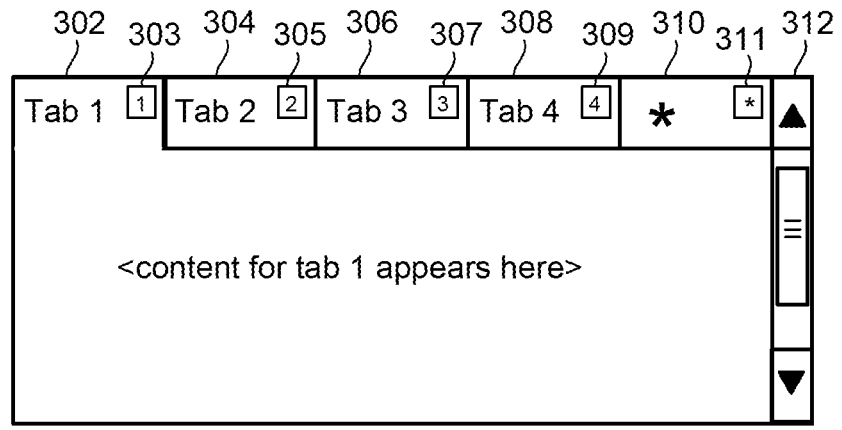
FIGS. 3A, 3B are additional example screenshots that may be used in the system 100 of FIG. 1.
Figure 3B:
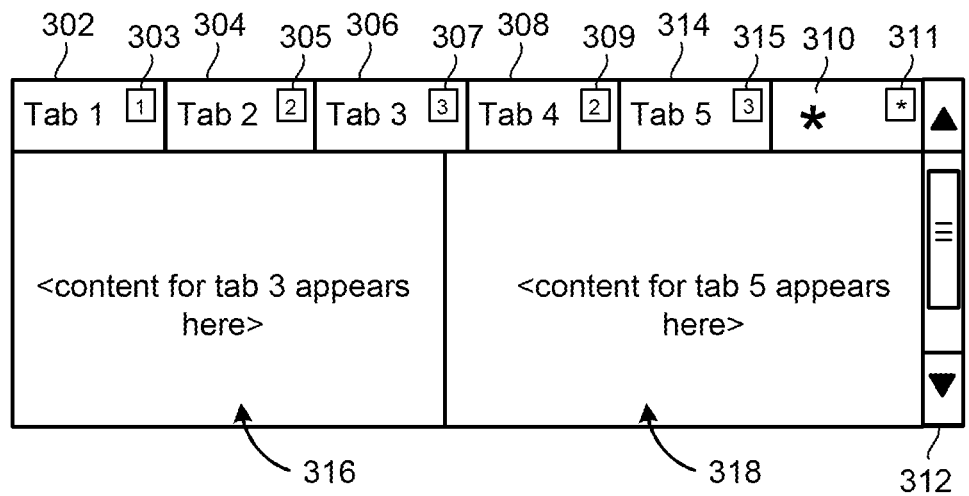

FIGS. 3A and 3B are screenshots of additional or alternative example implementations of the system 100. Specifically, in the example of FIGS. 3A, 3B, a display window is illustrated as having at least three layers, any one of which may include two or more tabs and associated content. Moreover, as illustrated and described below, all such tabs on a specific layer may be identified as being included in that layer, so that, in the screenshots of FIGS. 3A, 3B, the types of layer selections described above with respect to the configuration 106C of FIG. 1 may be implemented.

Specifically, in the example of FIG. 3A, a tab 302 is illustrated as being displayed within a front or visible layer, along with associated content thereof. Specifically, a layer selector icon 303 is illustrated which identifies the tab 302 as being included in a first layer, which happens to be the displayed layer of the example of FIG. 3A.

Meanwhile, a tab 304 is illustrated as being currently hidden or not visible, and is with a layer selector 305 which indicates that the tab 304 is presently included within a second layer. As may be observed in the example of FIG. 3A, a tab 308 is also associated with a layer selector 309 which indicates that the tab 308 is included with the tab 304 within the second layer associated with the layer selectors 305-309.

A tab 306 is illustrated together with a layer selector 307, where the layer selector 307 includes the number 3 to indicate that the tab 306 is included within a third layer. Further in FIG. 3A, a tab generator icon 310 is illustrated which, when selected, causes the generation of a new tab which, by default, may be included within a presently-displayed layer. Additionally, a layer generator 311 is illustrated which, similar to the tab generator 310, may be selected to generate a new layer, which may be identified as such and which may, by default, initially be empty of content until if and when tabs are transferred thereto and/or created therein. In these ways, new or additional tabs/layers may be created, as desired by a user. Of course, various other techniques may be used for tab/layer creation. For example, a menu or toolbar may be provided for tab/layer creation, or a drop-down menu may be provided, and/or a right-click mouse function may be utilized.

In the examples of FIGS. 3A and 3B, it may be appreciated that the layer designators 1, 2, 3 of the layer selectors 303, 305-309, and 307, respectively, do not necessarily indicate an actual order of the corresponding layers. That is, as may be appreciated from the above description, the various layers may be positioned relative to one another and any desired order, as long as the user of the system 100 is enabled to position tabs within desired layers, and to position a selective layer at the front of the overall stacked configuration of layers. Consequently, various other layer designators may be utilized in order to indicate inclusion of various tabs within the corresponding layer. For example, all tabs on a given layer may be presented in a single color, while tabs on another layer may be presented in a different color. Other indicators or designators for illustrating inclusion of multiple tabs within a single layer would be apparent to one of skill in the art.

FIG. 3B illustrates a variation of FIG. 3A, in which the tab generator 310 has been utilized to create a tab 314, which has been included within the third layer, as indicated by a layer selector 315. Further, in the example of FIG. 3B, the user is illustrated as having selected the third layer as a current front or visible layer. Consequently, as indicated by the layer selectors 307, 315, the third layer is provided as including tab content 316 associated with the tab 306, as well as tab content 318 associated with the tab 314.

Thus, from the examples of FIGS. 3A, 3B, it may be appreciated that the user may be enabled to easily and quickly select entire layers and all associated tabs and tab content for viewing thereof. In this regard, it may be appreciated that the various layer selectors may be implemented in many different ways. For example, in transitioning from the screenshot of FIG. 3A to the screenshot of FIG. 3B, the user may simply click on the layer selector 307. Consequently, in another example, the user might switch or transition from the screenshot of FIG. 3B to a subsequent screenshot, not specifically illustrated, in which the tabs 304, 308 at the second layer are displayed, simply by clicking on either of the layer selectors 305, 309. In considering variations and combinations of the screenshots of FIGS. 2A-2C and 3A, 3B, it may be appreciated that the tab transfer elements of FIGS. 2A-2C (e.g., 210, 216, 218, 224) and the various layer selectors of FIGS. 3A, 3B (e.g., 303, 305, 307, 309, 315) may be implemented in any number of various manners.

For example, such elements need not be explicitly provided as separate elements. Rather, the described functionality may be provided implicitly.

For example, in the example of FIG. 2A, the tabs 207, 208 are described as being included within the layer 206. As may be understood from the above description of FIGS. 3A, 3B, the tabs 207, 208 may therefore be provided in a different color than that of the tab 204 which is included within the layer 202. Then, simply by clicking on the tab 207 or the tab 208, the user may execute the type of layer selection described above with respect to FIGS. 3A, 3B (and with respect to the configuration 106C of FIG. 1).

Conversely, although FIGS. 3A, 3B are described in the context of transferring entire selected layers and all included tabs, it may of course be appreciated that the types of individual inter-layer tab transfers described with respect to FIGS. 2A-2C also may be executed. For example, and again conversely to the example just provided with respect to FIG. 2A, the user in FIGS. 3A, 3B may execute layer selections using the various layer selectors as described above, but may execute individual inter-layer tab transfers simply by clicking on a specific, desired tab. For example, with respect to FIG. 3A, the user may transfer the tab 304 to the first layer that is currently being displayed, simply by clicking on the tab 302 apart from the layer selector 305. At such time, a value of the layer 305 may be updated from the value 2 to the value 1.

In other example implementations, the functionalities described with respect to layer selections and inter-layer tab transfers may be combined within a single element or icon.

For example, in the examples of FIGS. 3A, 3B, the various layer selectors may be utilized to perform inter-layer tab transfers as well. For example, in FIG. 3A, the user may wish to transfer the tab 306 from the third layer to the second layer. In order to do so, the user may double click or otherwise select the layer selector 307, in order to thereby activate a text entry functionality with respect to the layer 307. Then, the user simply may enter the value 2 and press enter, whereupon the transfer manager 122 of FIG. 1 may transfer the tab 306 from the third layer to the thus-entered second layer.

In similar implementations, the user may execute such inter-layer tab transfers using the layer selectors in conjunction with a pop-up menu. That is, for example, in executing the tab transfers as just described, the user may double click or otherwise select the layer selector 307, and may thereafter be provided with a pop-up menu which includes all layers which are currently existing and available for transfer (e.g., here layers 1 and 2).

In the various examples described with respect to FIGS. 1-3B, it may be appreciated that the various example techniques described herein are implemented in the described examples with respect to a single display window. Consequently, the user may be provided with control over the various combinations of displayed tabs, also in the context of the single display window.

For example, in the example of FIG. 3A, a vertical scrollbar is illustrated which enables the user to scroll through the content of the tab 302 in a conventional manner. Consequently, in the example of FIG. 3B, in which two separate tabs 306, 314 are provided in conjunction with associated content 316, 318, the scrollbar 312 may be utilized to scroll through both of the display tabs simultaneously, while also maintaining a synchronization and alignment there between. For example, in scenarios in which the application 104 includes a spreadsheet application, the configuration of FIG. 3B enables the user to view multiple spreadsheets within the tabs 306, 314, while aligning the various rows or columns in a desired fashion, and thereafter maintaining such alignment during use thereof, including in the manner just described with respect to the scrollbar 312.

Although the example of the scrollbar 312 is provided above, it may be appreciated that, more generally, the various tabs of a layer may be aligned with one another. Then, the view generator 102 may be configured to cause at least one screen control of the display window, such as the scrollbar 312, to control all of the tabs within the layer, while maintaining the alignment thereof.

Of course, many other example embodiments may be implemented, which are not necessarily described here in detail, but which would be understood to one of ordinary skill in the art. For example, while the various parallel tabs on a given layer are described and illustrated herein as generally being next to one another in a horizontal direction, it may be appreciated that many other configurations are possible. For example, the various tabs may be presented vertically, one on top of the other, in which case the various tab and/or layer indicators also may be displayed vertically, In other example embodiments, the various tabs displayed in parallel on a single layer may be provided in a grid fashion, and/or may be capable of being dragged and dropped relative to one another within the front, visible layer.

Moreover, whether displayed horizontally or vertically, it may be appreciated that the various tabs may be reordered relative to one another within a given layer, or within the display window itself. Further, user interaction may be provided to enable a single tab to quickly utilize all available space within a layer. For example, in the example of FIG. 3B, a user may wish to utilize the entirety of the available display area to view content for the tab 306. In such cases, the user may be able to click or double click on the tab 306, to thereby expand the content 316 to utilize all available space, e.g., either by transferring the tab 314 to a different layer, or simply by minimizing a size of the content 318 within the display window relative to the size of the content 316.

Figure 4:
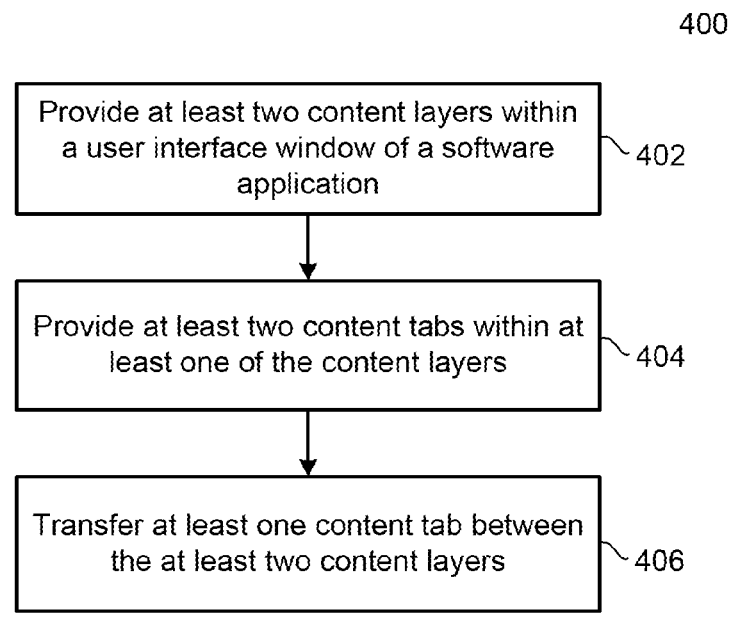
FIG. 4 is a flowchart illustrating example operations of the system of FIG. 1.

FIG. 4 is a flowchart 400 illustrating example operations of the system 100 of FIG. 1. In the example of FIG. 4, operations 402-406 are illustrated as separate, sequential operations. However, it may be appreciated that, in alternate embodiments, two or more of the operations 402-406 may be implemented in a partially or completely overlapping and parallel manner, and/or in a nested, iterative, or looped fashion. Moreover, additional or alternative operations may be included, in one or more of the operations 402-406 may be partially or completely omitted.

In the example of FIG. 4, at least two content layers are provided within the user interface window of the software application (402). For example, the layer manager 118 of the view generator 102 may provide the layers 108, 110 as described and with respect to FIG. 1, and as similarly described with respect to the various content layers of FIGS. 2A-3B.

At least two content tabs may be provided within at least one of the content layers (404). For example, the tab manager 120 may be configured to provide the tabs 112, 114 within the layer 108, as described above with respect to configuration 106B of FIG. 1, and as described with respect to, e.g., FIGS. 2B, 2C, and 3B.

At least one content tab may be transferred between the at least two content layers (406). For example, the transfer manager 122 may be configured to transfer the tab 114 from the layer 108 to the layer 110, as may occur in transitioning from the configuration 106B to the configuration 106A of FIG. 1.

Figure 5:
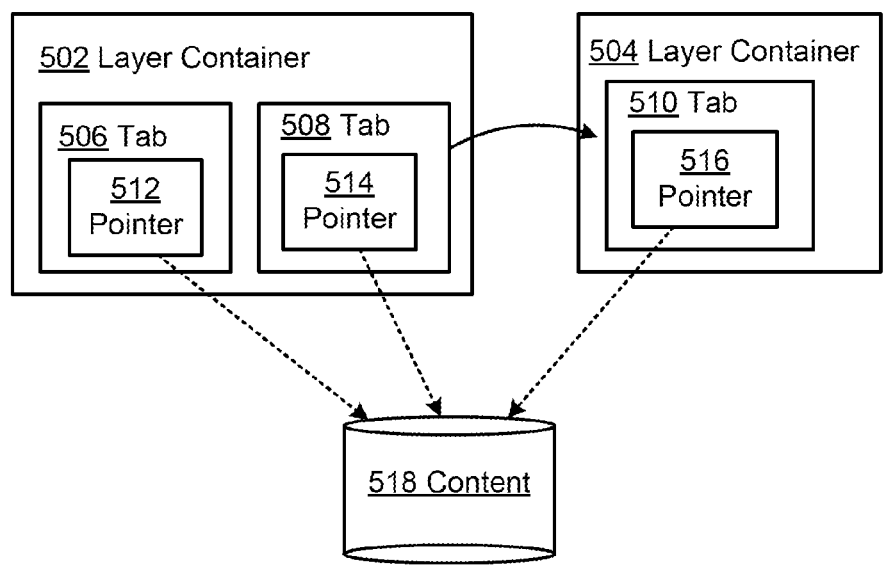
FIG. 5 is an example data structure that may be utilized in the system of FIG. 1.

FIG. 5 is a block diagram of a data structure that may be utilized within the presentation model 124 of FIG. 1. In the example of FIG. 5, layer containers 502, 504 are illustrated as corresponding to respective layers, e.g., as corresponding to the layers 108, 110 of FIG. 1, and/or to the layers 202, 206 of FIGS. 2A-2C. In the example, the layer container 502 is illustrated as including tab 506 and tab 508, while the layer container 504 is illustrated as including tab 210. Thus, such a configuration might correspond, for example, to the example of FIG. 2B, in which two tabs, 204, 207 are included within the first layer 202, while a third tab 208 is included within the second layer 206.

In the example of FIG. 5, the tab 506 is illustrated as including a pointer 512 which links the tab to the corresponding content thereof within content 518. Similarly, the tabs 508, 510 include corresponding pointers 514, 516, which themselves point to relevant, corresponding content for the tabs 508, 510. Thus, using the data structure of FIG. 5, it may be appreciated that additional layer containers may be generated as needed, and tabs may be generated within, or moved among, the various layer containers. Consequently, the data structure of FIG. 5 represents a straightforward, hierarchical data structure which may be utilized to implement the system 100 of FIG. 1.

Figure 6:
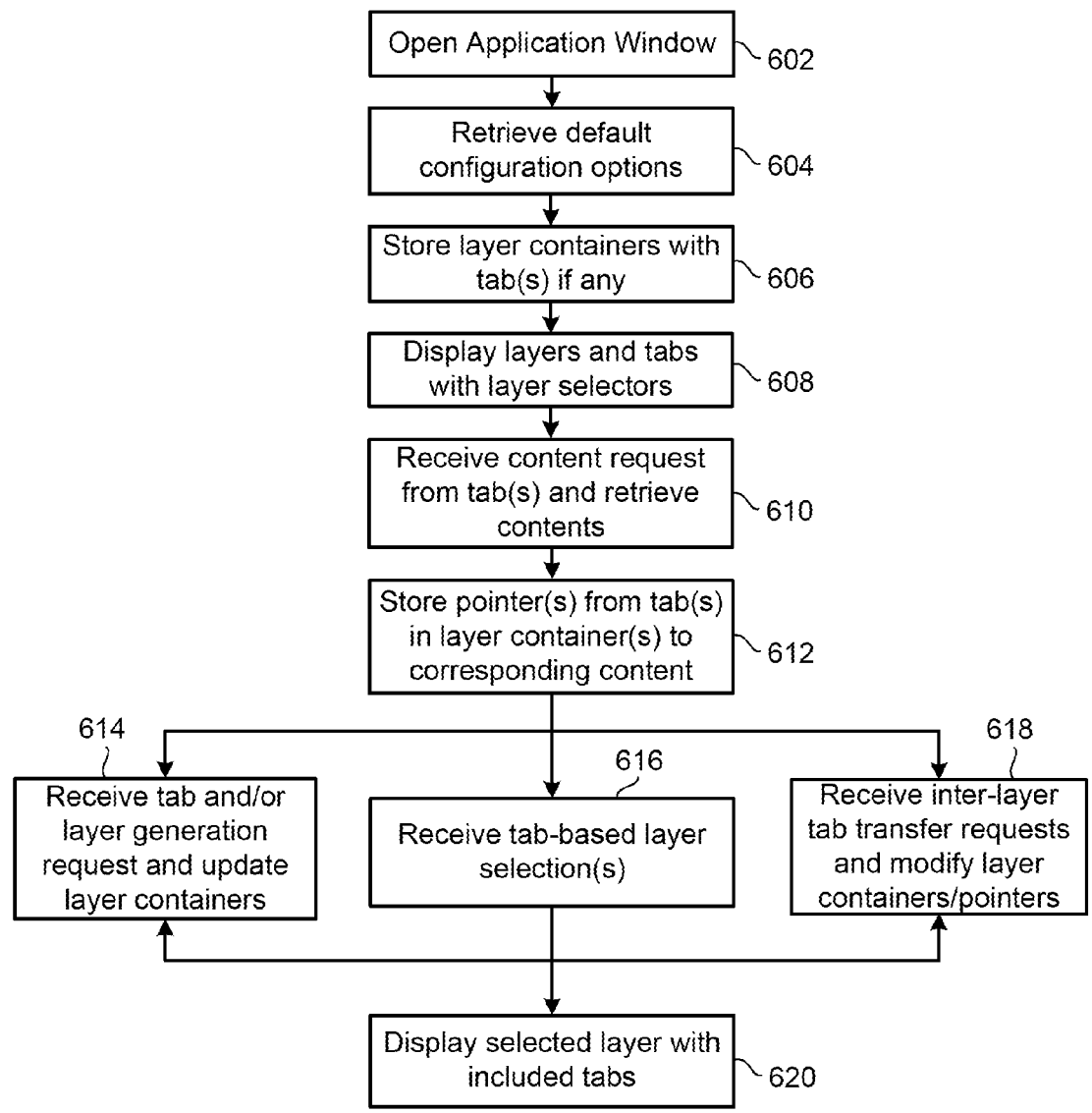
FIG. 6 is a more detailed example flowchart illustrating example operations of the system of FIG. 1 when using the data structure of FIG. 5.

FIG. 6 is a flowchart 600 illustrating more detailed example operations of the system 100 of FIG. 1, using the data structure of FIG. 5. In the example of FIG. 6, the user may open an application window (602), whereupon the view generator 102 may retrieve the default configuration options from the default options 126 (604).

Based on the retrieved default options, the view generator 102, e.g., the layer manager 118 and/or the tab manager 120, may store corresponding layer containers including associated tabs, if any (606). Consequently, the corresponding layers and tabs may be displayed, along with corresponding layer selectors (608). In the example, as described above with respect to FIGS. 3A, 3B, the layer selectors may include, or be associated with, corresponding tab transfer elements, so that, as described, either individual tabs and/or entire layers with all associated tabs, may be manipulated and configured for display in a manner desired by the user.

In the context of a specific tab, the user may request specific content. For example, in a word processing or a spreadsheet scenario, the user may request to open a previously-saved file, or may request the opening of a new file (610). Thus, all such content may be associated with corresponding tabs, so that pointers from the tabs within the layer containers may be stored as corresponding to the respective content (612). In this way, the data structure of FIG. 5 may be established.

Thereafter, the view generator 102 may provide any and all of the various functionalities described above, and the various manners corresponding to whatever user selections may occur. For example, the view generator may receive various tab and/or layer generation requests by way of the input handler 116, whereupon the layer manager 118 and/or the tab manager 120 may update the layer containers accordingly. The view generator 102 also may receive various tab-based layer selections (616). For example, as described above with respect to FIGS. 3A and 3B, the various individual tabs may each be associated with a corresponding layer selector, so that the user may select one or more layers to view (or to hide), along with all associated tabs within the specified layer.

Additionally, as described, the view generator 102 may receive various inter-layer tab transfer requests, and may correspondingly modify the layer containers and pointers (618). For example, with respect to FIG. 5, the view generator 102, by way of the input handler 116, may receive an inter-layer tab transfer request for transferring the tab 508 from the layer of the layer container 502 to the layer of the layer container 504. Then, the pointer 514 may be updated to point from the layer container 504 to the same portion of the content 518 previously identified thereby.

In any and all such scenarios, the view generator may thus display selected layers with included tabs (620), while simultaneously hiding remaining layers within the stacked configuration of layers just described herein. Consequently, as described, the user may be provided with fast, convenient, efficient means for viewing and manipulating data.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device (computer-readable medium) for processing by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be processed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the processing of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments. It should be understood that they have been presented by way of example only, not limitation, and various changes in form and details may be made. Any portion of the apparatus and/or methods described herein may be combined in any combination, except mutually exclusive combinations. The embodiments described herein can include various combinations and/or sub-combinations of the functions, components and/or features of the different embodiments described.

What is claimed is:
1. A computer system comprising:
at least one processor;

instructions recorded on a computer-readable medium and executable by the at least one processor, the instructions including:
- a layer manager configured to cause the at least one processor to provide, within a user interface window of a software application, at least a first content layer and a second content layer provided in a stacked arrangement in which the first content layer is visible at a front of the stacked arrangement and the second content layer is at least partially obscured behind the first content layer;
- a tab manager configured to cause the at least one processor to concurrently display at least a first content tab and a second content tab within the first content layer, wherein the first content tab includes a first tab control, a first tab transfer element, and a first content pane, and wherein the second content tab includes a second tab control, a second tab transfer element and a second content pane;
- and a transfer manager configured to cause the at least one processor to transfer, in response to a user selection of the second tab transfer element, the second content tab between the first content layer and the second content layer, including continuing to display the first content tab within the first content layer subsequent to the transfer.

2. The system of claim 1, wherein the layer manager is further configured, subsequent to the transfer, to visibly indicate inclusion of the second content tab within the second content layer, concurrently with the display of the first content tab within the first content layer.

3. The system of claim 2, wherein the layer manager is further configured to receive a user selection of the second content layer by way of a layer selector displayed in conjunction with the visible indication of inclusion of the second content tab within the second content layer, and thereafter transfer the second content layer and the second content tab to the front of the stacked arrangement, thereby at least partially obscuring the first content layer and the first content tab within the stacked arrangement.

4. The system of claim 3, wherein the second content layer includes a third content tab that is transferred with the second content layer and the second content tab to the front of the stacked arrangement and displayed concurrently with the second content tab within the second content layer, and further wherein a visible indication of inclusion of the third content tab within the second content layer is provided in conjunction with the layer selector prior to the transfer of the second content layer, the second content tab, and the third content tab to the front of the stacked arrangement.

5. The system of claim 1, wherein the tab manager is configured to provide a third content tab with a third tab transfer element, which, in response to user selection thereof, causes the transfer manager to execute an inter-layer tab transfer of the third content tab from its current content layer to a different content layer.

6. The system of claim 1, wherein the tab manager is configured to provide user-selectable sizing elements for adjusting relative sizes of the first content tab and the second content tab when displayed within the first content layer prior to the transfer.

7. The system of claim 1, comprising default options which are selectable by a user and which store display configurations of the first content tab, the second content tab, the first content layer, and the second content layer across two or more sessions.

8. The system of claim 1, wherein at least one of the first content tab and the second content tab is displayed with a tab float element, which, in response to a user selection thereof, causes the tab manager to display the corresponding tab outside of the display window as being separately and independently movable and/or adjustable with respect to the first content layer and the second content layer.

9. The system of claim 1, wherein the first content tab and the second content tab are aligned with one another, and wherein a view generator is configured to cause at least one screen control of the display window to control the first content tab and the second content tab while maintaining the alignment thereof.

10. A computer-implemented method, comprising:
- displaying at least a first content tab and a second content tab concurrently within a visible content layer of a plurality of content layers stacked within a user interface window of a software application, with the visible content layer displayed at a front of the plurality of content layers and in front of at least one obscured content layer of the plurality of content layers, wherein the first content tab includes a first tab control and a first content pane, and wherein the second content tab includes a second tab control and a second content pane;
- storing at least a third content tab in conjunction with a corresponding obscured content layer of the plurality of content layers, wherein the third content tab includes a third tab control and a third content pane;
- displaying a first inter-layer tab transfer element for the first content tab for transfer thereof between the visible content layer and the corresponding obscured content layer;
- displaying a second inter-layer tab transfer element for the second content tab for transfer thereof between the visible content layer and the corresponding obscured content layer;
- displaying a third inter-layer tab transfer element for the third content tab for transfer thereof between the corresponding obscured content layer and the visible content layer, wherein the first inter-layer tab transfer element, the second inter-layer tab transfer element, and the third inter-layer tab transfer element are displayed concurrently with the visible content layer;
- and displaying a layer selector for the corresponding obscured content layer for exchange thereof, together with the third content tab, with the visible content layer.

11. The method of claim 10, further comprising:
- displaying a fourth inter-layer tab transfer element concurrently with the visible content layer and corresponding to a fourth content tab included with the third content tab within the corresponding obscured content layer.

12. The method of claim 11, further comprising:
- displaying the third inter-layer tab transfer element and the fourth inter-layer tab transfer element with a visual indication that the third content tab and the fourth content tab are included within the corresponding obscured content layer.

13. The method of claim 10, further comprising:
- displaying each inter-layer tab transfer element together with a layer selector for specifying a destination content layer of the stacked arrangement of content layers for the corresponding content tab being transferred between content layers.

14. The method of claim 10, wherein at least one of the first content tab, the second content tab, and the third content tab is displayed with a tab float element, which, in response to a user selection thereof, causes the corresponding tab to be displayed outside of the display window and to be separately and independently movable and/or adjustable with respect to the stacked arrangement of content layers.

15. The method of claim 10, wherein the first content tab and the second content tab are aligned with one another, and wherein at least one screen control of the user interface window is provided which controls both of the first content tab and the second content tab while maintaining the alignment thereof.

16. A computer program product, the computer program product being tangibly embodied on a non-transitory computer-readable storage medium and comprising instructions that, when executed, are configured to cause at least one processor to:
   store at least a first content layer including at least a first content tab and at least a second content layer including at least a second content tab, wherein the first content tab includes a first tab control and a first content pane, and wherein the second content tab includes a second tab control and a second content pane;
   display the first content layer as a visible content layer causing the second content layer to be an at least partially obscured content layer;
   display the first content tab within the first content layer as the visible content layer;
   display, together with the visible content layer, a first inter-layer tab transfer element configured to transfer the first content tab to the second content layer;
   display, together with the visible content layer, a second inter-layer tab transfer element configured to transfer the second content tab to the first content layer;
   display, together with the visible content layer, a layer selector configured to select the second content layer as the visible content layer and the first content layer as the at least partially obscured layer;
   and execute, for the visible content layer, a content tab sizing adjustment in response to any inter-layer tab transfer to or from the visible content layer, including concurrently displaying any two or more content tabs selected for inclusion within the visible content layer.

17. The computer program product of claim 16, wherein the instructions, when executed, are further configured to cause the at least one processor to
   store a third content tab in association with the second content layer and the second content tab;
   provide the layer selector as identifying the second content tab and the third content tab with the second content layer;
   receive a selection of the layer selector and exchange the second content layer with the first content layer to make the second content layer the visible layer, including concurrent, size-adjusted displaying of the second content tab and the third content tab within the second content layer.

18. The computer program product of claim 16, wherein the instructions, when executed, are further configured to cause the at least one processor to
   provide at least a third content layer, wherein the first inter-layer tab transfer element is configured to receive a selection of either the second content layer or the third content layer for inclusion therein.

* * * * *